March 24, 1959   J. P. HEISS   2,879,057
ADJUSTABLE SELF-PUMPING LEVELING SYSTEM
Filed May 21, 1956   2 Sheets-Sheet 1
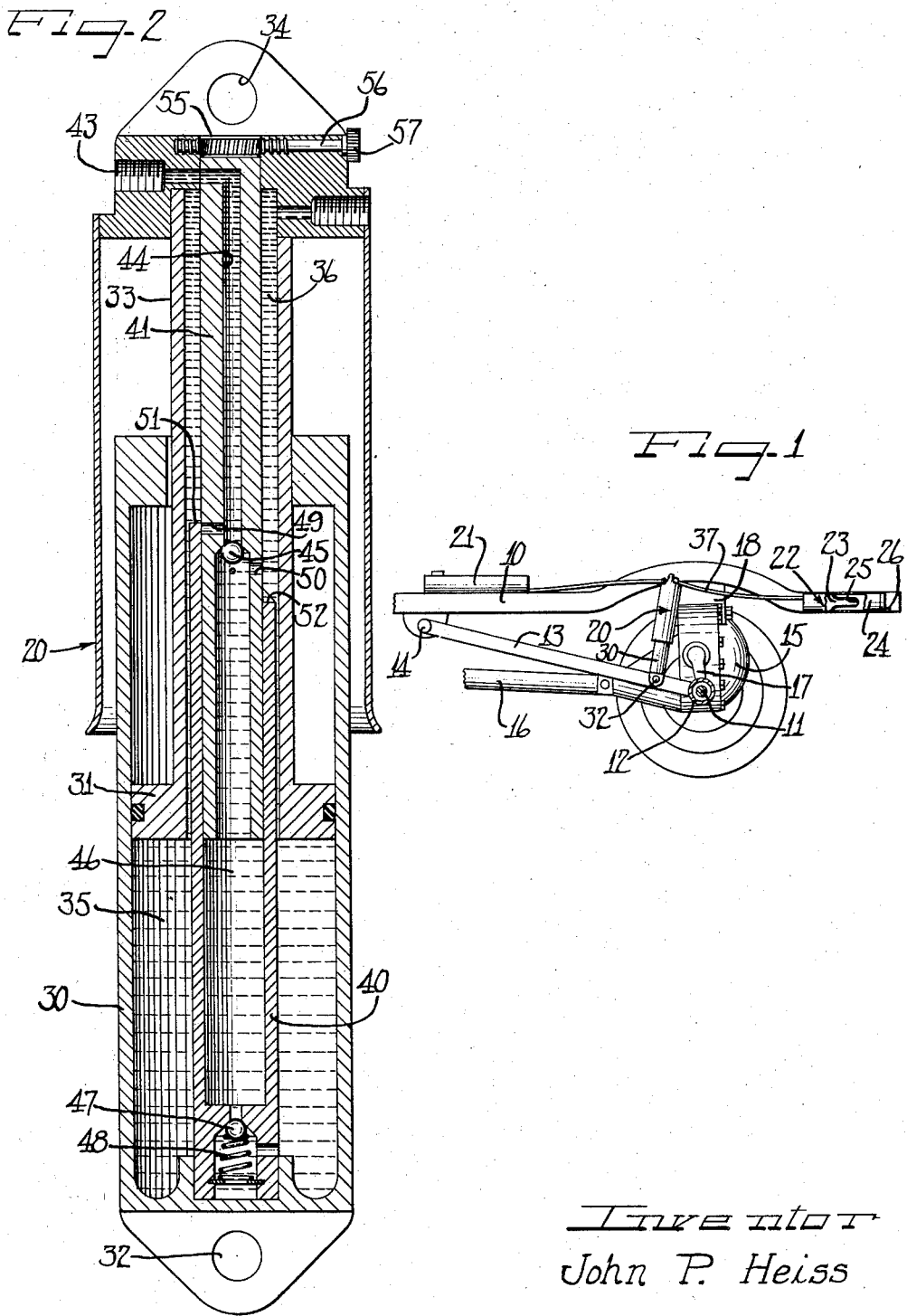
Inventor
John P. Heiss March 24, 1959     J. P. HEISS     2,879,057
ADJUSTABLE SELF-PUMPING LEVELING SYSTEM
Filed May 21, 1956     2 Sheets-Sheet 2
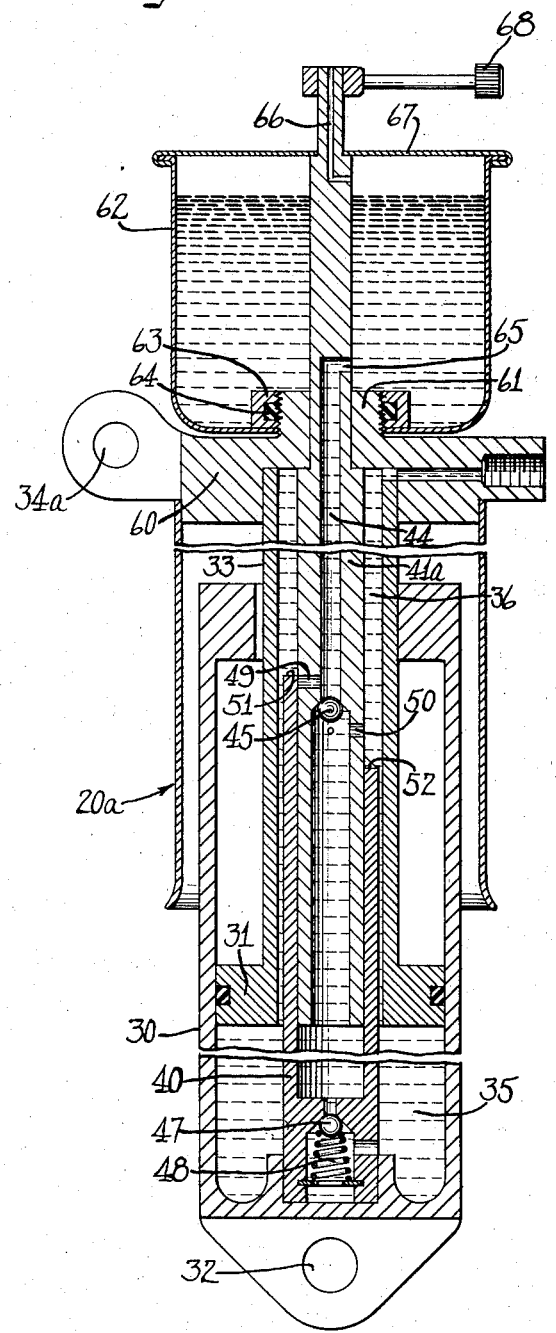
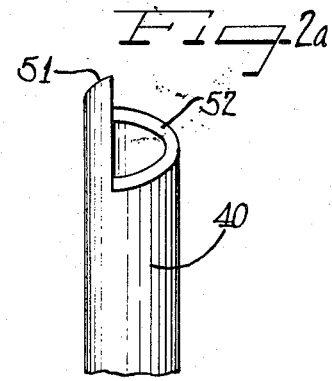
Inventor
John P. Heiss

# United States Patent Office 2,879,057
Patented Mar. 24, 1959

2,879,057
ADJUSTABLE SELF-PUMPING LEVELING SYSTEM

John P. Heiss, Flint, Mich., assignor to Thompson Products, Inc., Cleveland, Ohio, a corporation of Ohio Application May 21, 1956, Serial No. 586,273

13 Claims. (Cl. 267—64)

The present invention relates to vehicle suspension systems and is, more particularly, concerned with the provision of a novel and substantially improved system and apparatus for resiliently suspending a vehicle a predetermined level above the road or other supporting surface.

As those skilled in the art of vehicle suspension are aware, great advances have been made in recent years in vehicle suspension systems. In particular, substantial advances have been made toward eliminating the conventional mechanical springs ordinarily associated with automotive vehicle suspension, in favor of pneumatic or hydraulic-pneumatic springs. In the developments heretofore made in the hydraulic-pneumatic field, satisfactory operation has required the provision of a pump or other source of high pressure hydraulic fluid. This fluid was placed under the control of a leveling valve responsive to changes in vehicle position and was directed to a spring or strut to re-extend such spring or strut upon a collapse in the level of the vehicle resulting from the addition of weight thereto. The necessity for hydraulic circuitry of such systems has rendered them relatively expensive, although in some instances they have been substantially more efficient in operation than the prior art mechanical spring constructions.

The present invention is concerned with the provision of a hydraulic-pneumatic vehicle leveling system requiring no separate pump or other source of hydraulic fluid under pressure other than is found directly in the leveling struts themselves. In particular, the invention contemplates the provision of a self-pumping leveling strut for each of the vehicle wheels. This strut is constructed to provide leveling support for the vehicle and at the same time maintain sufficient pressure within itself to maintain the strut extended to a predetermined level condition independently of the load placed on the vehicle. In one form of the invention as above set forth, the point of adjustment, or the leveling height provided by the leveling strut may be adjusted to any level within a moderate operating range.

In accomplishing the above mentioned functions, the present invention contemplates the provision of a substantially vertically disposed hydraulic cylinder of a type similar to the direct acting strut type shock absorbers now in conventional vehicle use. The ends of the cylinder are respectively connected to the vehicle wheel axle and the vehicle frame and a body of fluid is trapped within an expansible chamber within the strut. The body of fluid is in hydraulic contact with a body of fluid in an hydraulic-pneumatic spring and downward movement of the vehicle frame relative to the vehicle wheel during road operation of the vehicle will cause displacement of fluid from the strut to the spring. Release of the pressure tending to force the fluid into the spring from the strut, as when the vehicle body rebounds upwardly from a downward movement, permits the spring to return the hydraulic fluid to the leveling strut. Under such circumstances the vehicle maintains its average level substantially constant. However, if an additional weight is applied to the vehicle, tending to force an additional body of fluid into the hydraulic-pneumatic spring for a substantial period of time, a self-contained force pump within the housing of the strut and operable upon vibrations in the vehicle suspension, injects additional hydraulic fluid into the chamber within the strut. This fluid is injected into the strut from a low pressure reservoir and remains in the strut to return the strut to its predetermined average design level until such time as the above mentioned load is removed. At that time, the additional fluid injected into the hydraulic strut is returned to the reservoir.

By providing a relatively small reservoir and by providing such a reservoir for each of the individual leveling struts positioned at the respective individual vehicle wheels, an automatic leveling system is provided for the vehicle in which no central pumping system is necessary. Further, no complex hydraulic circuits and valves are necessary to correlate the individual wheels under the present system since each wheel will seek its own predetermined design level independently of the action of the others.

It is, accordingly, an object of the present invention to provide a substantially improved and simplified leveling system for automotive vehicles or the like.

Another object of the present invention is to provide an improved, self-contained, hydraulic-pneumatic suspension system for vehicles.

Yet another object of the present invention is to provide a novel and extremely simple strut type hydraulic-pneumatic leveling apparatus containing within its confines a reciprocal fluid pump capable of injecting hydraulic fluid under substantial pressure into a pressurized chamber in the strut for maintaining the strut at a predetermined degree of extension.

Yet a further object of the present invention is to provide a self-pumping hydraulic-pneumatic suspension system for vehicles capable of maintaining the individual vehicle wheel in a predetermined position relative to the vehicle frame.

Another object of the invention is to provide an adjustable self-contained hydraulic leveling strut and leveling pump.

A feature of the invention resides in the utilization of the vibratory action of an automotive vehicle, during the normal driving thereof, for actuating a simple force pump to maintain the vehicle in an average, predetermined level condition.

Still a further feature of the invention resides in the provision of a novel force pump centrally located within an expansible leveling strut and easily adjustable from the outside of the strut to control the point of initiation of pumping action and to thereby control the average elongation of the leveling strut during vehicle operation.

Yet a further object of the present invention is to provide a novel vehicle leveling system wherein individual leveling action is provided for the individual vehicle wheels without a central source of hydraulic fluid under pressure and without subjecting the entire system to collapse upon disuse of the vehicle for moderately short periods of time.

Still other and further objects and features of the present invention will at once become apparent to those skilled in the art from a consideration of the attached drawings wherein two preferred forms of the invention are shown by way of illustration only, and wherein:

Figure 1 is a side elevational view, in diagrammatic form, of a vehicle suspension embodying the present invention;

Figure 2 is a side elevational view in cross section of a leveling strut and pump constructed in accordance with the principles of the present invention;

Figure 2a is an elevational view of a part of the leveling control valve of the present invention; and Figure 3 is a modified form of the combined leveling strut and pumping apparatus shown in Figure 2.

As shown in the drawings:

As may be seen from a consideration of Figure 1, a vehicle frame 10 rotatably supports a rear wheel axle 11 within a rear axle housing 12. The housing 12 is carried by a trailing link 13 of the rigid type pivotally secured to the frame as at 14. Power for rotating the axle 11 may be derived from a conventional differential gear 15 driven by a propeller shaft 16 and fixedly secured to the frame by bracket 18. Connection between the axle 11 and the differential gear 15 may be by any conventional means, such as for example stub axle shaft 17 connected to the differential gear by a universal joint and to the axle 11 by a second universal joint in order to permit vertical movement of the axle 11 during its rotation.

As illustrated, the suspension system is devoid of the usual mechanical springs and utilizes in place thereof a hydraulic-pneumatic spring suspension system. This system comprises a hydraulic strut 20 supplied with hydraulic fluid from a low pressure reservoir 21. The strut 20 contains an expansible chamber varying in size with the degree of extension of the strut and upon collapse of the strut due to downward movement of the frame 10 relative to the axle 11 fluid is forced from the strut 20 into an hydraulic-pneumatic spring 22 where it acts to further compress a confined body of gas. Rebound movement of the vehicle frame 10 upwardly away from the axle 11 permits re-expansion of the gas with movement of the fluid from the spring 22 back into the strut 20. The reservoir 21 is, of course, conventional. Likewise, the hydraulic-pneumatic spring 22 is conventional and may take any form in which an hydraulic chamber 23 is separated from the confined gas 24 by means of a flexible or movable partition 25, as shown diagrammatically in Figure 1. The spring rate of the hydraulic-pneumatic spring may be modified by the injection of additional gas under pressure at an inlet valve 26.

It will be seen that the control of the leveling system diagrammatically illustrated in Figure 1 is accomplished entirely within the leveling strut 20. A preferred form of this strut may be seen in enlarged cross sectional view in Figure 2. As there shown, the strut comprises a generally cylindrical housing 30 reciprocably carrying a piston 31. The housing 30 is, in the embodiment shown, secured to the vehicle axle support by a pivotal connection 32 while the piston 31 is carried by a hollow piston rod 33 which is in turn pivotally secured to the vehicle frame 10 as at 34.

A chamber 35 is formed between the lower face of the piston 31 and the cylinder 30. The chamber 35 is, for convenience sake, vented via an annular passage 36 in the piston rod 33 to the air spring 22 via conduit 37. Accordingly, the pressure within the hydraulic-pneumatic spring 22 will be the same as the pressure in the chamber 35. When the vehicle frame 10 moves downwardly relative to the axle 11 the piston rod 33 will carry the piston 31 downwardly to contract the chamber 35 and force hydraulic fluid therefrom into the chamber 23 of the spring 22. Return movement of the fluid into the chamber 35 upon instantaneous relief of the forces tending to contract the chamber 35 will move the piston 31 upwardly to realign the frame 10 relative to the axle 11.

It will be apparent that upon movement of the vehicle over an uneven road surface the inertia of the relatively heavy mass of the vehicle body and frame will require the axle 11 to move up and down relative thereto, contracting and then expanding the chamber 35. During such movements the vehicle will, of course, be suspended on the resilient chamber of confined gas at 24. If an additional load is placed on the vehicle, and remains there for some time, such as for example when an additional passenger embarks, the additional weight will move the piston 31 downwardly further compressing the gas 24. Under such circumstances the frame 10 will move downwardly relative to the axle to assume a lower or collapsed position, which is undesired. In order to move the frame 10 upwardly with this additional load, fluid under pressure must be applied to the chamber 35 to move the piston 31 upwardly without additional compression of the gas in chamber 24. In accordance with the principles of the present invention this additional hydraulic fluid is supplied to the chamber 35 by means of a pump contained entirely within the strut 20.

In the embodiment shown in Figure 2 the above mentioned pump comprises a pump cylinder 40 carried by the cylinder 30. A pump rod 41 is slidably mounted within the cylinder 40 and is carried for movement with the strut piston rod 33. As a result of this relationship, relative movement between the strut cylinder 30 and the strut piston rod 33 will cause simultaneous relative movement between the pump cylinder 40 and the pump rod 41.

Fluid under atmospheric pressure is supplied to the pump by means of conduit 43 leading to a bore 44 within the pump rod 41. An inlet check valve 45 permits flow of fluid downwardly into the pumping chamber 46 upon upward movement of the pump rod 41. Outlet check valve 47 permits flow of fluid from the pump chamber 46 into the strut chamber 35 upon attainment of a fluid pressure in the pump chamber 46 in excess of the pressure in chamber 35 by an amount equal to the force necessary to unseat the relatively light spring 48.

Control of the pumping action within the strut 20 is achieved by means of a leveling point port 49 and a pump action initiating port 50 which cooperate with respective lips 51 and 52 on the pump cylinder 40. As may be seen, the leveling point port connects the low pressure reservoir inlet 44 with the annular passage 36 which is under the hydraulic spring pressure of the suspension system. This connection is provided at any and all times in which the strut is extended beyond the extent providing the desired predetermined level condition. Thus, the exact position of the upper lip 51 on the pump cylinder 40 controls the maximum extension of the leveling strut. Whenever the strut expands, as a result of a reduction in weight on the vehicle frame, the port 49 moves upwardly away from the lip 51 and pressure within the spring is vented directly back into the reservoir via bore 44 until the frame 10 settles downwardly causing the pump rod 41 to move downwardly relative to the lip 51 closing off port 49 at the predetermined restored level condition. It will be apparent that it is impossible for the leveling system of the present invention to become over extended under any circumstance.

If it is assumed, for example, that several persons are added to the weight of the vehicle frame, with a resultant downward movement of the piston 31, the piston rod 41 of the fluid pump will move downwardly within the pump cylinder 40 until port 50 is completely closed. At this point in the operation, hydraulic fluid within the chamber 46 is completely confined and any additional downward movement of the pump rod 41, occasioned by road bumps or the like, will build up pressure in the chamber 46 opening the check valve 47 and supplying additional fluid to the strut chamber 35 to return the piston 31 upwardly. Upward movement of the piston 31 will, of course, carry the pump rod 41 upwardly until such time as the port 49 is again opened a slight amount at which point the leveling system will again be equalized at the predetermined level condition. By providing the port 50 connecting the pump chamber 46 and the fluid under pressure in chamber 35, no pumping action can take place until a predetermined drop in the vehicle frame is achieved. This prevents constant pumping of the system under very minor variations in vehicle level, which constant pumping under certain circumstances will provide an undesirable hunting action in the system.

It will be apparent that the leveling point is determined by the position of the lip 51 and, accordingly, adjustment may be provided for the system by providing a change in the position of the lip 51 relative to the pump rod 41. Since it is preferred that the pumping action control port 50 assume operation a predetermined fixed distance of pump rod travel subsequent to closing of the port 49, the lips 51 and 52 bear a specific predetermined axial relation with each other. Accordingly, by providing the lips 51 and 52 in a spiral form as indicated in Figure 2a, rotation of the pump cylinder 40 relative to the pump rod 41 will automatically provide a vertical adjustment of both lips 51 and 52 relative to the rod 41. In the embodiment shown in Figure 2 relative movement is achieved by rotation of the pump rod 41 by means of a worm wheel 55 driven by an adjusting worm 56 having a wrench engaging projection 57 extending outside the casing of the leveling strut. It will be understood that the adjustment illustrated is only one of many techniques which may be used. For example, the pump cylinder 40 may be rotated from below in a manner similar to the rotation of the rod 41 and/or either the rod 41 or the cylinder 40 may be moved axially relative to the respective piston rod 33 and cylinder 30.

In the embodiment of the invention illustrated in Figure 3 the strut 20a is essentially the same as that shown in Figure 2 insofar as the pumping structure is concerned. Using like numbers in Figure 3 for the parts corresponding exactly with those of Figure 2, it will be noted that the strut cylinder 30, the pump cylinder 40, the piston 31 and the pump check valves 45 and 47 are identical to the form shown in Figure 2. Instead of providing a separate reservoir, however, the embodiment in Figure 3 provides an integrated reservoir carried by the upper end of the piston rod 33 on end cap 60. As may be seen, the end cap is provided with an upstanding threaded projection 61 upon which a cup-shaped reservoir 62 is positioned by means of a retaining nut 63 and a washer 64. The pump rod 41a extends up through the projection 61 and the low pressure supply conduit 44 therein is vented to the reservoir as at 65. Liquid is inserted in the reservoir 62 by means of a filling port 66 in the pump rod 41a which extends upwardly beyond the upper cap 67 of the reservoir 62.

Since, in the embodiment shown in Figure 3, the pump rod 41a projects completely out of the overall casing of the leveling strut 20a, adjustment of the level of the strut may be accomplished by directly rotating the rod 41a through a lever 68. The lever 68 may be controlled by any manual means either at the side of the individual leveling strut or by means of a control linkage of the mechanical type connecting the individual arms 68 of the struts to a master control within the passenger compartment of the vehicle.

It will thus be understood that I have provided an extremely effective leveling system of the hydraulic-pneumatic type. In accordance with the present invention the hydraulic circuit is completely self-contained with each individual leveling strut and spring combination and no external high pressure pumps of any sort are required. Further, the weight of the vehicle and the oscillations thereof provide the motive power for operating the individual pump and accordingly no horsepower is robbed from the vehicle power plant for leveling purposes. Adjustment of the system is readily provided and the leveling control point is not subject to change by external impacts on the system such as might be occasioned by flying stones or the like, since the parts are located within the center of the individual leveling struts. Since it is further apparent that variations and modifications may be made in the structure as illustrated, without departing from the scope of the novel concepts of the present invention, it is my intention that the scope of the invention be limited solely by that of the hereinafter appended claims.

I claim as my invention:

1. In combination in a leveling system for a vehicle having a frame and at least one wheel rotatably suspended therefrom, a pneumatic spring, a strut positioned between said frame and said wheel, an expandable and contractible fluid-filled strut chamber in said strut in fluid connection with said spring, means contracting said strut chamber when said frame moves toward said wheel and expanding said chamber when said frame moves away from said wheel, a reservoir, a conduit providing a first fluid conduit between said reservoir and said strut chamber, a second conduit connecting said reservoir to the strut chamber and including a pumping chamber separate from said strut chamber, means expanding and contracting said pumping chamber simultaneously with the expansion and contraction of said strut chamber, a check valve in said second conduit preventing movement of fluid into said reservoir from said pump chamber, and a second check valve preventing flow from said strut chamber to said pump chamber.

2. Leveling structure in accordance with the provisions of claim 1 wherein said fluid comprises a substantially incompressible liquid.

3. In combination in a leveling system for a vehicle having a frame and at least one wheel rotatably suspended therefrom, a pneumatic spring, a strut positioned between said frame and said wheel, an expandable and contractible fluid-filled strut chamber in said strut in fluid connection with said spring, means contracting said strut chamber when said frame moves toward said wheel and expanding said chamber when said frame moves away from said wheel, a reservoir, a first conduit providing a fluid connection between said reservoir and said strut chamber, a second conduit connecting said reservoir to the strut chamber and including a pumping chamber, means expanding and contracting said pumping chamber simultaneously with the expansion and contraction of said strut chamber, a check valve in said second conduit preventing movement of fluid into said reservoir from said pump chamber, a second check valve preventing flow from said strut chamber to said pump chamber, and cut-off means operative to block said first conduit when said strut chamber has contracted to a predetermined point.

4. In combination in a leveling system for a vehicle having a frame and at least one wheel rotatably suspended therefrom, a pneumatic spring, a strut positioned between said frame and said wheel, an expandable and contractible fluid-filled strut chamber in said strut in fluid connection with said spring, means contracting said strut chamber when said frame moves toward said wheel and expanding said chamber when said frame moves away from said wheel, a reservoir, a first conduit providing a fluid connection between said reservoir and said strut chamber, a second conduit connecting said reservoir to the strut chamber and including a pumping chamber, means expanding and contracting said pumping chamber simultaneously with the expansion and contraction of said strut chamber, a check valve in said second conduit preventing movement of fluid into said reservoir from said pump chamber, a second check valve preventing flow from said strut chamber to said pump chamber, cut-off means operative to block said first conduit when said strut chamber has contracted to a predetermined point, and means to adjust the position of said cut-off means to provide fluid cut-off at different points of strut chamber contraction.

5. In combination in a leveling system for a vehicle having a frame and at least one wheel rotatably suspended therefrom, a pneumatic spring, a strut positioned between said frame and said wheel, an expandable and contractible fluid-filled strut chamber in said strut in fluid connection with said spring, means contracting said strut chamber when said frame moves toward said wheel and expanding said chamber when said frame moves away from said wheel, a reservoir, a first conduit providing a fluid connection between said reservoir and said strut chamber, a second conduit connecting said reservoir to the strut chamber and including a pumping chamber, means expanding and contracting said pumping chamber simultaneously with the expansion and contraction of said strut chamber, a check valve in said second conduit preventing movement of fluid into said reservoir from said pump chamber, a second check valve preventing flow from said strut chamber to said pump chamber, cut-off means operative to block said first conduit when said strut chamber has contracted to a predetermined point, a fluid by-pass connecting said pumping chamber and said strut chamber, and second cut-off means for blocking said by-pass when said strut chamber has contracted to a predetermined point.

6. In combination in a leveling system for a vehicle having a frame and at least one wheel rotatably suspended therefrom, a pneumatic spring, a strut positioned between said frame and said wheel, an expandable and contractible fluid-filled strut chamber in said strut in fluid connection with said spring, means contracting said strut chamber when said frame moves toward said wheel and expanding said chamber when said frame moves away from said wheel, a reservoir, a first conduit providing a fluid connection between said reservoir and said strut chamber, a second conduit connecting said reservoir to the strut chamber and including a pumping chamber, means expanding and contracting said pumping chamber simultaneously with the expansion and contraction of said strut chamber, a check valve in said second conduit preventing movement of fluid into said reservoir from said pump chamber, a second check valve preventing flow from said strut chamber to said pump chamber, cut-off means operative to block said first conduit when said strut chamber has contracted to a predetermined point, a fluid by-pass connecting said pumping chamber and said strut chamber, and second cut-off means for blocking said by-pass when said pumping chamber has contracted to a predetermined point.

7. In combination in a leveling system for a vehicle having a frame and at least one wheel rotatably suspended therefrom, a pneumatic spring, a strut positioned between said frame and said wheel, an expandable and contractible fluid-filled strut chamber in said strut in fluid connection with said spring, means contracting said strut chamber when said frame moves toward said wheel and expanding said chamber when said frame moves away from said wheel, a reservoir, a first conduit providing a fluid connection between said reservoir and said strut chamber, a second conduit connecting said reservoir to the strut chamber and including a pumping chamber, means expanding and contracting said pumping chamber simultaneously with the expansion and contraction of said strut chamber, a check valve in said second conduit preventing movement of fluid into said reservoir from said pump chamber, a second check valve preventing flow from said strut chamber to said pump chamber, cut-off means operative to block said first conduit when said strut chamber has contracted to a predetermined point, a fluid by-pass connecting said pumping chamber and said strut chamber, second cut-off means for blocking said by-pass when said strut chamber has contracted to a predetermined point, and means to adjust the position of said second cut-off means to cut off fluid flow through said by-pass at different points of strut chamber contraction.

8. In combination in a leveling system for a vehicle having a frame and at least one wheel rotatably suspended therefrom, a pneumatic spring, a strut positioned between said frame and said wheel, an expandable and contractible fluid-filled strut chamber in said strut in fluid connection with said spring, means contracting said strut chamber when said frame moves toward said wheel and expanding said chamber when said frame moves away from said wheel, a reservoir, a first conduit providing a fluid connection between said reservoir and said strut chamber, a second conduit connecting said reservoir to the strut chamber and including a pumping chamber, means expanding and contracting said pumping chamber simultaneously with the expansion and contraction of said strut chamber, a check valve in said second conduit preventing movement of fluid into said reservoir from said pump chamber, a second check valve preventing flow from said strut chamber to said pump chamber, cut-off means operative to block said first conduit when said strut chamber has contracted to a predetermined point, means to adjust the position of said cut-off means to provide fluid cut-off at different points of strut chamber contraction, a fluid by-pass connecting said pumping chamber and said strut chamber, second cut-off means for blocking said by-pass when said strut chamber has contracted to a predetermined point, and means to adjust the position of said second cut-off means to cut off fluid flow through said by-pass at different points of strut chamber contraction, both said adjusting means being interconnected for simultaneous adjustment.

9. A leveling strut for use with a fluid reservoir and a fluid energized pneumatic spring, comprising a cylinder, a piston reciprocable in said cylinder and defining a strut chamber therewith, a fluid conduit connecting said strut chamber to said spring, a piston rod supporting said piston to move said piston within said cylinder to contract or expand said strut chamber, an axial bore in said piston rod and opening into said strut chamber, a cylindrical tube projecting from the end of said cylinder remote from said piston through said strut chamber and into said piston rod bore in reciprocable relation relative thereto, a rod secured to said piston rod in said bore and slidable in said tube to provide a pump chamber therein which contracts and expands simultaneously with said strut chamber, a fluid passage in said rod connecting said pump chamber to the reservoir, a check valve in said passage preventing fluid flow from said pump chamber to said reservoir, and a second passage in said tube connecting said pump chamber and said strut chamber and provided with a check valve preventing flow from said strut chamber to said pump chamber.

10. A leveling strut for use with a fluid reservoir and a fluid energized pneumatic spring, comprising a cylinder, a piston reciprocable in said cylinder and defining a strut chamber therewith, a fluid conduit connecting said strut chamber to said spring, a piston rod supporting said piston to move said piston within said cylinder to contract or expand said strut chamber, an axial bore in said piston rod and opening into said strut chamber, a cylindrical tube projecting from the end of said cylinder remote from said piston through said strut chamber and into said piston rod bore in reciprocable relation relative thereto, a rod secured to said piston rod in said bore and slidable in said tube to provide a pump chamber therein which contracts and expands simultaneously with said strut chamber, a first fluid passage in said rod connecting said pump chamber to the reservoir, a check valve in said passage preventing fluid flow from said pump chamber to said reservoir, a second passage in said tube connecting said pump chamber and said strut chamber and provided with a check valve preventing flow from said strut chamber to said pump chamber, a by-pass passage connecting said first fluid passage at a point between said first check valve and said reservoir to said bore, and cut-off means associated with the end of said cylindrical tube operative to block said by-pass passage when said strut chamber has contracted to a predetermined point.

11. A leveling strut for use with a fluid reservoir and a fluid energized pneumatic spring, comprising a cylinder, a piston reciprocable in said cylinder and defining a strut chamber therewith, a fluid conduit connecting said strut chamber to said spring, a piston rod supporting said piston to move said piston within said cylinder to contract or expand said strut chamber, an axial bore in said piston rod and opening into said strut chamber, a cylindrical tube projecting from the end of said cylinder remote from said piston through said strut chamber and into said piston rod bore in reciprocable relation relative thereto, a rod secured to said piston rod in said bore and slidable in said tube to provide a pump chamber therein which contracts and expands simultaneously with said strut chamber, a first fluid passage in said rod connecting said pump chamber to the reservoir, a check valve in said passage preventing fluid flow from said pump chamber to said reservoir, a second passage in said tube connecting said pump chamber and said strut chamber and provided with a check valve preventing flow from said strut chamber to said pump chamber, a by-pass port connecting said first fluid passage at a point between said first check valve and said reservoir to said bore, cut-off means associated with the end of said cylindrical tube operative to block said by-pass passage when said strut chamber has contracted to a predetermined point, a second fluid by-pass passage connecting said pumping chamber and said bore, and second cut-off means associated with the end of said cylindrical tube for blocking said second by-pass passage when said strut chamber has contracted to a predetermined point.

12. A leveling strut for use with a fluid reservoir and a fluid energized pneumatic spring, comprising a cylinder, a piston reciprocable in said cylinder and defining a strut chamber therewith, a fluid conduit connecting said strut chamber to said spring, a piston rod supporting said piston to move said piston within said cylinder to contract or expand said strut chamber, an axial bore in said piston rod and opening into said strut chamber, a cylindrical tube projecting from the end of said cylinder remote from said piston through said strut chamber and into said piston rod bore in reciprocable relation relative thereto, a rod secured to said piston rod in said bore and slidable in said tube to provide a pump chamber therein which contracts and expands simultaneously with said strut chamber, a first fluid passage in said rod connecting said pump chamber to the reservoir, a check valve in said passage preventing fluid flow from said pump chamber to said reservoir, a second passage in said tube connecting said pump chamber and said strut chamber and provided with a check valve preventing flow from said strut chamber to said pump chamber, a by-pass passage connecting said first fluid passage at a point between said first check valve and said reservoir to said bore, cut-off means associated with the end of said cylindrical tube operative to block said by-pass passage when said strut chamber has contracted to a predetermined point, a second fluid by-pass passage connecting said pumping chamber and said bore, second cut-off means associated with the end of said cylindrical tube for blocking said second by-pass passage when said strut chamber has contracted to a predetermined point, and means for adjusting said tube relative to said rod slidable therein for adjusting the points of operation of both of said cut-off means.

13. A leveling strut for use with a fluid reservoir and a fluid energized pneumatic spring, comprising a cylinder, a piston reciprocable in said cylinder and defining a strut chamber therewith, a fluid conduit connecting said strut chamber to said spring, a piston rod supporting said piston to move said piston within said cylinder to contract or expand said strut chamber, an axial bore in said piston rod and opening into said strut chamber, a cylindrical tube projecting from the end of said cylinder remote from said piston through said strut chamber and into said piston rod bore in reciprocable relation relative thereto, a rod secured to said piston rod in said bore and slidable in said tube to provide a pump chamber therein which contracts and expands simultaneously with said strut chamber, a first fluid passage in said rod connecting said pump chamber to the reservoir, a check valve in said passage preventing fluid flow from said pump chamber to said reservoir, a second passage in said tube connecting said pump chamber and said strut chamber and provided with a check valve preventing flow from said strut chamber to said pump chamber, a by-pass passage connecting said first fluid passage at a point between said first check valve and said reservoir to said bore, cut-off means associated with the end of said cylindrical tube operative to block said by-pass passage when said strut chamber has contracted to a predetermined point, a second fluid by-pass passage connecting said pumping chamber and said bore, second cut-off means associated with the end of said cylindrical tube for blocking said second by-pass passage when said strut chamber has contracted to a predetermined point, and means for adjusting said tube relative to said rod slidable therein for adjusting the points of operation of both of said cut-off means, said last-named means comprising means for rotating said last-named rod and a spiral surface on the end of said tube simultaneously cooperating with both said by-pass ports.

References Cited in the file of this patent

UNITED STATES PATENTS

| | | |
|---|---|---|
| 1,340,233 | Liebau | May 18, 1920 |
| 2,436,573 | Heynes | Feb. 24, 1948 |
| 2,812,954 | Lyon | Nov. 12, 1957 |
| 2,814,482 | Anderson et al. | Nov. 26, 1957 |